(12) United States Patent
Hoffmann et al.

(10) Patent No.: US 7,197,874 B2
(45) Date of Patent: Apr. 3, 2007

(54) PLUNGER MASTER BRAKE CYLINDER

(75) Inventors: Jan Hoffmann, Rossbach (DE); Michael Vetter, Lake Orion, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 0 days.

(21) Appl. No.: 11/195,236

(22) Filed: Aug. 2, 2005

(65) Prior Publication Data
US 2007/0028614 A1 Feb. 8, 2007

(51) Int. Cl.
*B60T 7/00* (2006.01)
*F15B 7/08* (2006.01)

(52) U.S. Cl. .......................... 60/568; 60/585

(58) Field of Classification Search ................ 60/562, 60/568, 585, 588
See application file for complete search history.

(56) References Cited

U.S. PATENT DOCUMENTS 3,421,322 A * 1/1969 Reznicek ............... 60/562
2004/0011614 A1 1/2004 Feigel

* cited by examiner

*Primary Examiner*—Michael Leslie

(57) ABSTRACT

In a plunger master brake cylinder (1), the closed end (5) of the main bore (3) is manufactured in one piece with the housing (2). The pistons (6,7) are inserted from the open end (4) of the main bore (3). In order to prevent the pistons (6,7) from slipping out of the main bore (3) prior to assembly in the vehicle, a retaining pin 23 is provided, which has a length greater than the diameter of the pistons (6,7) and than the diameter of the open end (4) of the main bore (3). The pin 23 extends through radial holes (20) in the spring retainer (13) of the compression spring 12 coupled to the outer piston (7). The pin is inserted through a small radial opening 26 in the housing 2 and is limited in its outward movement by a step (25) in the main bore (3).

6 Claims, 2 Drawing Sheets

PLUNGER MASTER BRAKE CYLINDER

BACKGROUND OF THE INVENTION

The present invention relates to a plunger master cylinder for an automotive brake system, with a cylinder housing with a main bore which is open on one axial end and closed on the other axial end, with a main bore encompassing one piston entirely inside the bore and a outer piston sealing the bore from the outside at the open end. Tandem master cylinders are used as pressure generators for the actuation of the pistons in brake calipers in two brake circuits, with the pedal force exerted by the driver being boosted by a brake booster, as the case may be, and evenly distributed to the brake calipers by way of the pressure generator by axially moving the plunger pistons as to displace brake fluid from two pressure chambers in the main bore. Plunger tandem master cylinders eliminate the need for valves inside the pistons because fluid channels entering the main bore are controlled by the peripheral edges of the pistons which axially move across these channels, thereby connecting them to or disconnecting them from the pressure chambers inside the main bore.

US 20040011614 A1 shows such a plunger master cylinder. Unlike conventional plunger cylinders, the described cylinder eliminates the need for a complicated assembly. Instead of using a large-diameter end closure member and sealing devices withstanding high pressure, as they are necessary in previously known plunger master cylinders, the closed end of the main bore in the described cylinder is manufactured in one piece with the cylinder. Accordingly, the assembly is carried out from the open end of the main bore by inserting the pistons and their compression springs from this side.

Considering the high pressure generated by a master cylinder, this is a great advantage regarding cost and safety. Either just the outer piston or each piston is first connected to its respective compression spring by attaching it to a compressible spring retainer which limits the expansion of the spring. Then the spring assigned to the inner piston is inserted into the bore, followed by the inner piston, which may be connected via a retainer, and then by the preassembled arrangement of the outer spring and the outer piston held together by the retainer. Once the master cylinder is attached to the brake booster, the elements inserted into the cylinder bore are held in place. The accommodation of such a master cylinder inside a vehicle is relatively easy due to its reduced size compared to conventional plunger cylinders.

However, if the brake system needs to be filled with brake fluid prior to assembly in the vehicle, the plunger pistons can slide out of the bore due to the fact that the brake fluid is supplied under high pressure. This makes a plunger tandem master cylinder as described in US 20040011614 A1 unsuitable for such a procedure unless additional measures are taken to prevent the pistons from exiting the bore.

It is therefore an objective of the present invention to present a simple solution to make this type of plunger cylinder arrangement suitable for the so-called evacuation-and-fill process.

It is a further objective to avoid a large closing member requiring substantial efforts to properly seal its edges to withstand high pressure.

SUMMARY OF THE INVENTION

These objectives are achieved by providing a radial opening in the periphery of the cylinder through which a locking member is inserted, which prevents the retainer of the outer piston from moving outward past a defined position. To this end, the bore is provided with a step or a recess to accommodate the locking member, which has at least one dimension in a radial direction of the bore that is larger than the diameter of the pistons. The locking member cannot move further outward than to the axial position of the step or to the end of the recess.

Providing the receiving portion in the retainer has the advantage that the retainer will not need to move as far as the outer piston, whose stroke is roughly twice the distance of the stroke of the inner piston. The retainer of the outer piston abuts the inner piston and thus only moves as much as the inner piston. On the other hand, it is connected to the outer piston and thus prevents the entire arrangement from slipping out if limited in its outward movement. Thus, providing the retainer with the locking member makes it easier to prevent interference by the locking member with seals and fluid channels entering the cylinder while preventing a disassembly of the cylinder arrangement.

Such a radial opening can be substantially smaller than the previously used end closure members and may simply be shut by a screw or even a press-fitted ball or the like.

The locking member can have any shape that allows it to be inserted radially into the bore and to be connected to the retainer. The smallest radial opening is needed for a cylindrical pin which is a little longer than the diameter of the pistons.

Further details and variations can be gathered from the following description of the attached drawings of two embodiments.

DETAILED DESCRIPTION OF THE DRAWINGS

Figure 1:
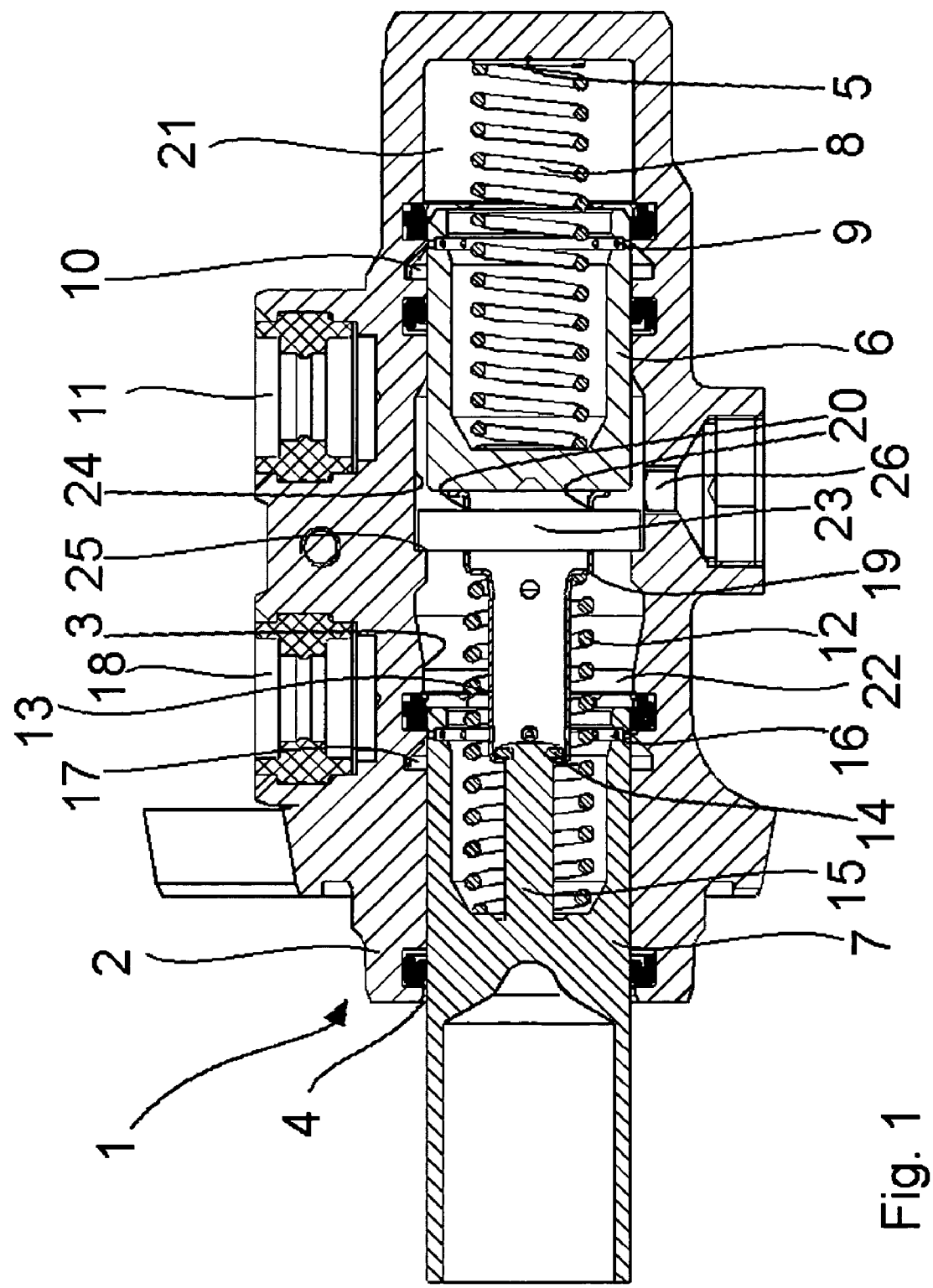
FIG. 1 shows a first embodiment with the locking member penetrating the compression spring attached to the outer piston.

The tandem master cylinder 1 of FIG. 1 comprises a housing 2 with a main bore 3. The main bore 3 is open at one end 4 and closed its other end 5. The closed end 5 is manufactured in one piece with the housing 2.

Two plunger pistons 6 and 7 are arranged in the main bore 3 as follows:

An inner piston 6 is in its entirety arranged within the main bore 3 and is basically cup-shaped. Its inside accommodates a portion of a first compression spring 8 which with one end abuts the inner bottom of the cup and with its other end the closed end 5 of the main bore 3. In the example shown, the relaxed length of the spring is as depicted so that no retainer is needed to keep it from extending further than shown. Of course, a spring with a retainer or cage attached to the inner piston would be an adequate arrangement as well.

Near the rim of the cup, the inner piston 6 comprises a plurality of radial holes 9 through its substantially cylindrical wall that are arranged in an annular groove provided on the inside wall of the cup. These holes 9 cooperate with an annular groove 10 in the main bore which is connected to a first reservoir port 11 via a fluid connection that is outside the pictured plane and thus not visible in the figure. Depending on the axial position of the inner piston 6, a fluid connection between the inside of the cup-shaped inner piston and thus the end portion of the main bore is established or shut off. The cavity extending between the closed end of the main bore 3 and the inner face of the inner piston 7 constitutes a first pressure chamber 21, which is connected to a first brake circuit via a fluid port that is not depicted because it is located outside the image plane.

A second, outer, piston 7 is arranged in a way that one of its ends is exposed to the outside atmosphere and thus separates the main bore from the outside. The outer piston is provided with a second compression spring 12. The expansion of the spring 12 is limited by a retainer 13 which is coupled to the outer piston 7 by means of a snap ring 14. In the example shown, the spring retainer 13 is arranged on the inside of the compression spring 12 and attached to a protrusion 15 formed on the outer piston which extends inside the spring 12, which, in similarity to the arrangement of the inner piston, partially extends into a cup-shaped portion of the outer piston 7. It is irrelevant for the invention in which way the spring is arranged or retained. A spring cage arranged around the compression spring and possibly attached to the rim of the cup-shaped portion would be one of many options to realize the same functionality.

In analogy to the inner piston 6, the outer piston 7 comprises a plurality of radial holes 16 through the substantially cylindrical wall of its cup-shaped portion that are arranged in an annular groove provided on the inside wall of the cup. These holes 16 cooperate with an annular groove 17 in the main bore which is connected to a second reservoir port 18 via a fluid connection that is outside the pictured plane and thus not visible in the figure. Depending on the axial position of the outer piston 7, a fluid connection between the inside of the cup-shaped portion and thus the outward-facing end of the inner piston 6 is established or shut off. The cavity extending between the two pistons 6 and 7 constitutes a second pressure chamber 22, which is connected to a second brake circuit via a fluid port that is not depicted because it is located outside the image plane.

The outer end of the outer piston 7 is shaped to accommodate the end of an actuating rod.

Since the entire piston arrangement must be inserted from the open end of the main bore 3, there is the possibility that the pistons are pushed out of the main bore if pressure is built up in the pressure chambers 21 and 22 before the brake booster with the actuating rod is attached. This situation occurs during a so-called evacuation-and-fill process, during which the brake system is pre-filled with brake fluid before the final assembly in the vehicle.

In order to equip the plunger master cylinder 1 for this procedure, the spring retainer 13 comprises an axial extension 19 with a radial through hole 20, in this example established by two opposite punched holes in the axial extension of the sheet metal retainer 13. These holes 20 accommodate a steel retaining pin 23 whose length is greater than the diameter of the pistons 6 and 7.

When the actuating rod pushes the outer piston toward the inner piston, the inner piston will move toward the closed end 5 of the main bore 3, thus equaling out the forces resulting from the pressure difference between the first and the second pressure chamber as well as the compression springs 8 and 12, which act upon the inner piston in opposite directions.

Accordingly, the main bore 3 comprises a widened section 24, which extend axially to allow the retaining pin to move along with the inner piston 6, while at the same time providing a step 25 limiting the pin's outward movement to the position shown, which approximately corresponds to the inner piston's relaxed position, i.e. the position without any force applied by pressure or actuating rod.

Since the length of the retaining pin exceeds the diameter of the main bore 3 at its open end 4, it cannot be inserted from that end. Therefore, a radial opening 26 is provided, which has a diameter just wide enough to allow for a radial insertion of the retaining pin 23. To this end, during the assembly of the master cylinder 1, a force is applied to the outer piston 7, which moves it toward the inner piston 6 and will compress the second and the first compression spring 12 and 8 so that the radial holes 20 in the extension 19 of the spring retainer 13 will be in the same axial position as the radial opening 26 in the housing 2. The pin 23 can be inserted, and the force on the outer piston can be removed. The pistons 6 and 7 will return to their shown position.

The inner piston 6 cannot move past the spring retainer 13, and the outer piston 7 is coupled to the spring retainer 13 by means of the snap ring 14. Accordingly, the pistons 6 and 7 cannot be moved outside the main bore 3 by any pressure built up in the pressure chambers 21 and 22.

In the shown example, the radial opening 26 is provided with a thread so that a screw can be used to seal the main bore 3 from the outside. A screw has the advantage that it can be removed if a disassembly of the arrangement is desired or necessary.

Compared to a large-diameter closure member at the end of the main bore, as it is customary in known plunger master cylinders, the radial opening 26 has the advantage of a significantly smaller diameter and thus a much smaller force acting on its closure member under prevailing pressure within the main bore. Accordingly, it is much easier and cheaper to provide an airtight and fluid-proof seal.

While a threaded closure is shown for the radial opening 26, it is also possible to use a ball closure or other known means to shut off this opening.

Figure 2:
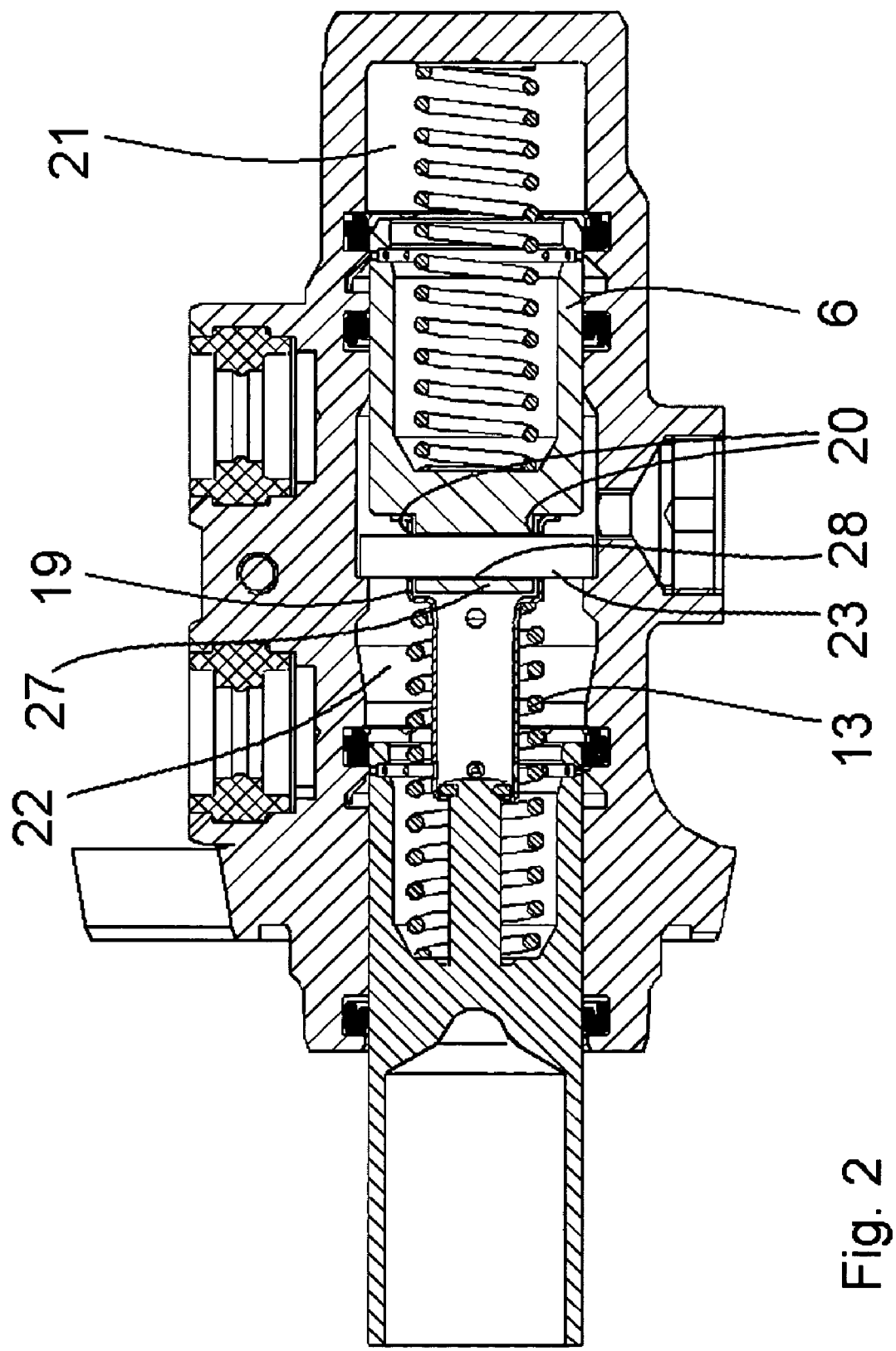
FIG. 2 shows a second embodiment in which the inner piston and the compression spring of the outer piston are coupled by the locking member.

The embodiment shown in FIG. 2 differs from the on in FIG. 1 in that an axial protrusion 26 is formed on the inner piston 6, which protrusion projects into the axial extension 22 of the spring retainer 13. the protrusion 27 is provided with a radial through-hole 28, which corresponds to the axial holes 20 in the extension 22, This arrangement couples the inner piston to the spring retainer 13 and ensures that the inner piston is moved outward with the spring retainer even in the event of a pressure failure in the first pressure chamber.

Although only two embodiments have been described, it is understood by any person of skill in the art that many variations of the design are conceivable without leaving the scope of the invention as defined by the claims.

What is claimed is:

1. A tandem master cylinder (TMC, 1) comprising
a housing (2) with a main bore which is open on one end,
a first pressure chamber (21),
an inner piston (6) that is linearly slidable in the housing to displace pressure medium out of the first pressure chamber (21),
a second pressure chamber (22),
an outer piston (7) that is linearly slidable in the housing to displace pressure medium out of the second pressure chamber (22), the inner piston (6) being acted upon by the pressure of the first pressure chamber (21) on one end and on the opposite end by the pressure of the second pressure chamber (22), and the outer piston (7) being acted upon by the pressure of the second pressure chamber (22) on one end and exposed to the outside atmosphere on the other end, and a compression spring (12) arranged between the two pistons (6,7) and coupled to the outer piston (7) by means of a retainer (13) allowing a limited expansion of the compression spring (12) toward the inner piston (6), wherein the housing (2) comprises a closable radial opening (26) and wherein the retainer (12) comprises a receiving portion (19,20) which radial opening (26) and receiving portion (19,20) are arranged with respect to each other so that a locking member (23) can be inserted through the radial opening (26) into the receiving portion (19,20).

2. The master cylinder of claim one, wherein the radial opening (26) comprises a thread for closing it with a screw or threaded bolt.

3. The master cylinder according to claim 1, wherein the locking member (23), after insertion into the retainer (13), cooperates with a step or recess (25,24) in the main bore, which prevents a movement of the locking member (23) toward the open end (4) of the main bore (3) beyond a defined position.

4. The master cylinder according to claim 1, wherein the locking member is a substantially cylindrical pin (23) with a length exceeding the diameter of the inner piston (6), extending radially through the receiving portion (19,20) of the retainer (13).

5. The master cylinder according to claim 1, wherein the two pistons (6,7) are coupled by means of the retainer (13).

6. The master cylinder according to claim 5, wherein the retainer (13) is connected to the inner piston (6) by means of the locking member (23), which penetrates the receiving portion (19,20) of the retainer as well as a portion (27) of the inner piston (6).

* * * * *